United States Patent
Melchior et al.

(10) Patent No.: US 6,757,460 B2
(45) Date of Patent: Jun. 29, 2004

(54) ELECTRO-OPTICAL MODULE FOR TRANSMITTING AND/OR RECEIVING OPTICAL SIGNALS ON AT LEAST TWO OPTICAL DATA CHANNELS

(75) Inventors: Lutz Melchior, Berlin (DE); Volker Plickert, Brieselang (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/894,675

(22) Filed: Jun. 28, 2001

(65) Prior Publication Data

US 2002/0176662 A1 Nov. 28, 2002

Related U.S. Application Data

(63) Continuation of application No. PCT/DE01/02077, filed on May 23, 2001.

(51) Int. Cl.[7] .............................. G02B 6/26; G02B 6/42; G02B 6/38; H04J 14/02
(52) U.S. Cl. .............................. 385/31; 385/33; 385/50; 385/59; 385/60; 398/79; 398/85
(58) Field of Search ............................... 385/31–93, 79, 385/85

(56) References Cited

U.S. PATENT DOCUMENTS

| | | | |
|---|---|---|---|
| 4,165,496 A | * | 8/1979 | Di Domenico, Jr. et al. . 385/48 |
| 4,285,571 A | * | 8/1981 | Winzer ......................... 385/34 |
| 4,339,290 A | * | 7/1982 | Winzer et al. ................. 385/51 |
| 4,456,329 A | * | 6/1984 | Henderson et al. ........... 385/44 |
| 4,549,782 A | | 10/1985 | Miller ........................... 385/48 |
| 4,576,436 A | * | 3/1986 | Daniel ........................... 385/25 |
| 4,611,884 A | | 9/1986 | Roberts ......................... 385/44 |
| 4,630,255 A | * | 12/1986 | Gouali ......................... 359/127 |
| 4,701,012 A | * | 10/1987 | Kaiser ......................... 359/128 |
| 4,776,660 A | | 10/1988 | Mahlein et al. ................ 385/44 |
| 4,881,789 A | | 11/1989 | Levinson ...................... 385/48 |
| 5,499,309 A | * | 3/1996 | Kozuka et al. ................ 385/38 |
| 5,841,562 A | | 11/1998 | Rangwala et al. ........... 359/152 |
| 5,867,617 A | * | 2/1999 | Pan et al. ...................... 385/18 |
| 6,055,099 A | * | 4/2000 | Webb ........................... 359/435 |
| 6,307,987 B1 | * | 10/2001 | Wang et al. ................... 385/31 |

FOREIGN PATENT DOCUMENTS

| | | | |
|---|---|---|---|
| EP | 0 238 977 A2 | 9/1987 | |
| EP | 0 844 503 A1 | 5/1998 | ............ G02B/6/42 |
| EP | 1 008 876 A2 | 6/2000 | |
| WO | WO 96/00915 | 1/1996 | |

\* cited by examiner

*Primary Examiner*—Brian Healy
*Assistant Examiner*—Kevin S. Wood
(74) *Attorney, Agent, or Firm*—Laurence A. Greenberg; Werner H. Stemer; Ralph E. Locher (57) ABSTRACT

The invention relates to an electro-optical module for transmitting and/or receiving optical signals on at least two optical data channels which are carried in an optical waveguide. The optical waveguide in the module forms at least two optical waveguide sections, with each section having at least one inclined end surface. The inclined end surfaces of the optical waveguide sections are positioned axially one behind the other. Light is injected into or light is output from the optical waveguide for a specific optical data channel by light for the optical data channel being passed to an inclined end surface, or emerging from it, at an angle to the optical axis of the optical waveguide.

30 Claims, 9 Drawing Sheets

ELECTRO-OPTICAL MODULE FOR TRANSMITTING AND/OR RECEIVING OPTICAL SIGNALS ON AT LEAST TWO OPTICAL DATA CHANNELS

CROSS-REFERENCE TO RELATED APPLICATION

This application is a continuation of copending International Application No. PCT/DE01/02077, filed May 23, 2001, which designated the United States.

BACKGROUND OF THE INVENTION

FIELD OF THE INVENTION

The invention relates to an electro-optical module for transmitting and/or receiving optical signals on at least two optical data channels.

Modules for bidirectional optical data traffic operate, for example, in a star structure in such a manner that data streams are transmitted in opposite directions—in the direction of a central feed point (upstream) and in the direction of further receivers (downstream)—in an optical fiber, in which case identical or different wavelengths can be used for the individual data channels. In particular, wavelength-division multiplexing methods are used in which light signals at a number of wavelengths are transmitted simultaneously on one optical fiber. There is thus a need for electro-optical modules having transmitting and receiving components which inject into an optical fiber, and output from it, signals for a number of optical data channels.

A module of this generic type is known from European Publication EP-A-238 977. This transmitting and receiving module for a bidirectional communications network uses free-beam optics in which spherical lenses are arranged at a distance from one another between a laser diode and the end of an optical fiber, and focus the laser light onto the end of the fiber. A wavelength-selective beam splitter is arranged between the spherical lenses, for wavelength separation, and separates light which is emitted from the end of the fiber and is at a wavelength different to the wavelength of the laser light from the beam path and passes it to a detector or receiving component.

A disadvantage of this known module is that the light is passed through free-beam areas. The lenses that are used thus act refractively, that is to say the refraction power acts only on the boundary surface between the lens and air. The presence of free-beam areas demands hermetic encapsulation of the module, in order to prevent condensation in the free-beam area. Furthermore, the known module must be mechanically very robust and insensitive to temperature fluctuations in order to ensure that the laser light is reliably injected into the optical fiber (the diameter of a single-mode optical fiber is generally only 9.3 mm). A final disadvantage of the known module is that an electrical connecting contact must be made on two different sides of the module. This involves increased installation complexity for the user.

International publication WO-A-96/00915 discloses a module for multiplexing/demultiplexing of optical signals, which forms a phased array grating on a substrate and is used both for separation and for combination of a number of optical channels. The waveguides are in the form of integrated optical waveguides. A disadvantage of this arrangement is that the transmitting and receiving components must be mounted on or attached to the substrate without being capped. The substrates are also relatively large, since the waveguides must be routed with large radii, and are correspondingly expensive. A further problem is that special structures are required in order to couple external optical waveguides to the substrate.

Furthermore, fully integrated bidirectional modules for transmitting and receiving optical signals are known, in which the waveguides, transmitting component and receiving component are integrated on a common semiconductor substrate mount. However, these modules are very expensive.

SUMMARY OF THE INVENTION

It is accordingly an object of the invention to provide an optical module which overcomes the above-mentioned disadvantageous of the prior art apparatus and methods of this general type. In particular, it is an object of the invention to provide an optical module based on a new module concept for transmitting and/or receiving optical signals, and which has a simple, compact and modular design and can be produced cost-effectively.

With the foregoing and other objects in view there is provided, in accordance with the invention an electro-optical module for transmitting and/or receiving light of a plurality of optical channels. The electro-optical module includes an optical waveguide with at least two optical waveguide sections each section having at least one inclined end surface. The inclined end surfaces of the optical waveguide sections are positioned axially one behind the other. Light is injected into or light is output from the optical waveguide for a specific optical data channel by light for the optical data channel being passed to an inclined end surface, or emerging from it, at an angle relative to the optical axis of the optical waveguide.

The solution according to the invention provides a physical concept which is based on using a type of optical "T-piece" in which the horizontal arm of the T is provided by mutually adjacent optical waveguide sections. Light is output/injected at right angles or transversely from/into the optical waveguides by inclined end surfaces of optical waveguide sections at which the light is emitted or injected transversely. Such an end surface in this case always has an associated transmitting or receiving component arranged essentially at right angles to the optical axis of the optical waveguide. Optical coupling is provided in such a way that the light which is deflected on an inclined end surface passes through the sheath of the optical waveguide section (and adjacent materials) and is then coupled essentially by a free beam to the optically active area of the transmitting or receiving component, or vice versa.

The invention provides closed wave guidance in a transparent medium which essentially requires no free-beam optics for injecting light into and outputting light from the optical waveguide. The stability with regard to thermal and mechanical loads is in this case very high because of the closed wave guidance and because of the lack of optics which increase errors. A further advantage is that no wavelength-selective elements, which need to be installed separately, are required since the inclined end surfaces of the optical waveguide segments are used as mounts for these waveguide-selective elements.

Another advantage is that the solution according to the invention allows the optical waveguide to be routed close to the transmitting or receiving component, which can be connected directly to a holder for the optical waveguide, and that the electrical connections of the module are located on one side of the module. The latter facilitates simple installation.

In accordance with an added feature of the invention, at least one end surface of the optical waveguide sections is coated with a wavelength-selective filter. This allows use for wavelength division multiplexing, in which light signals at different wavelengths are transmitted on the optical waveguide. One wavelength is output via each wavelength-selective filter applied to the end surface, while that end surface is transparent to any other wavelength or wavelengths.

In accordance with an additional feature of the invention, the end surfaces of two adjacent optical waveguide sections are coplanar. This means that the two end surfaces of adjacent optical waveguide sections are immediately adjacent to one another with as little gap as possible in the joint so that scarcely any losses arise due to reflections between the two end surfaces. The angle of the end surfaces to the optical axis of the optical waveguide is essentially 45°. The term "essentially" in this case means that there may also be deviations from this value (of up to 20°) in order to avoid feedback, for example. The only essential feature is that the injected or output light is deflected sufficiently by the inclined end surface.

In accordance with another feature of the invention, the optical waveguide sections are each arranged in a glass ferrule which is transparent for light at the wavelengths used and which has an end surface inclined in a corresponding manner to the optical waveguide sections at its ends. The deflective light in this case first of all passes through the sheath of the optical waveguide section, and then through the glass ferrule, and vice versa. The glass ferrules ensure that the optical waveguide sections are held and guided reliably.

In accordance with a further feature of the invention, there is provided, a mounting tube which accommodates the individual glass ferrules and the optical waveguide sections arranged in them, and positions them axially with respect to one another. The mounting tube preferably has a longitudinal slot and at the same time surrounds the glass ferrules in a spring manner. This allows tolerances in the internal diameter of the tube to be compensated for by the spring effect so that the only significant tolerances are those of the glass ferrule external diameter.

The use of a mounting tube to accommodate the glass ferrules in a spring manner and having a longitudinal slot also simplifies the installation of the optical waveguide sections and of the associated glass ferrules. When the glass ferrule sections are being introduced, it is desirable for them to be arranged in rows on their inclined end surfaces with as little gap at the joint as possible. Easily handled matching, without any clearance, between the outer surface of the ferrule and the inside of the mounting tube means that the inclined end surfaces can be located against one another essentially without any clearance simply by pressing the individual ferrules against one another, with any position that has been attained being maintained by virtue of the spring arrangement in the mounting tube and the force on the individual ferrules resulting from this. In the process, any lack of coplanarity of the end surfaces is overcome by axial pressure on the individual ferrules, which leads to the individual ferrules being rotated about the common axis, until coplanarity is achieved.

In accordance with a further added feature of the invention, an immersion means that fills any gap which is still present between the end surfaces of mutually adjacent optical waveguide sections. The immersion means has a matched refractive index. To this end, the invention preferably provides for a radial opening for insertion of the immersion means to be formed in the mounting tube in the region of each of the mutually adjacent optical waveguide sections or glass ferrules.

In accordance with a further additional feature of the invention, fixing means for fixing the mounting tube on a holder are preferably formed on the mounting tube. These fixing means are, in particular, longitudinal grooves.

In accordance with yet another feature of the invention, a number of transmitting or receiving components are arranged one behind the other in the module in the direction of the optical axis of the optical waveguide or of the optical waveguide sections. Each of the transmitting or receiving components is associated with an inclined end surface of an optical waveguide section. The module according to the invention in this case has the characteristics of a kit, since different transmitting or receiving elements can be arranged one behind the other as required and can thus be added to in particular to form a multiplexing/demultiplexing arrangement in which any desired number of transmitting and/or receiving components are arranged one behind the other. The end surfaces of the individual optical waveguide sections are in this case coated with wavelength-selective filters for different wavelengths, so that one data channel is in each case input or output on each boundary area between two adjacent optical waveguide sections.

The optical axis of a transmitting or receiving component in this case always runs (assuming that the end surface of the associated optical waveguide receiving is inclined at 45°) essentially at right angles to the optical axis of the optical waveguide section. "Essentially at right angles" in this case means that this may be an angle which allows the light falling on the end surface of the optical waveguide section to be deflected into the optical waveguide section, and vice versa.

In accordance with yet an added feature of the invention, the transmitting or receiving components are each arranged in a TO can. The TO cans are standard containers, known from the prior art, for optical transmitting or receiving modules, whose form is similar to the pack of a "classical" transistor, but which have a glass window for light to enter and emerge from on the upper face. The module according to the invention in this case preferably has a mounting pack associated with each TO can, which firstly accommodates the TO can and secondly has a mounting cap for accommodating and holding the mounting tube. The pack in this case has a window through which light can pass, or is composed of a translucent material, in order to avoid interfering with the beam path between the end surface of the respective optical waveguide section and the transmitting or receiving component.

The transmitting or receiving component may, however, also be arranged other than in a TO can, for example in a semiconductor pack which can be mounted on a printed circuit board. The mounting tube is then mounted on one side of the semiconductor pack.

In accordance with yet an additional feature of the invention, a lens for beam focusing is arranged in each beam path between an end surface of an optical waveguide section and the associated transmitting or receiving component. If the transmitting or receiving component is located very close to the associated optical waveguide section, it may, however, be possible to dispense with the lens optics as well.

In accordance with yet a further feature of the invention, the optical waveguide core becomes larger from a first optical waveguide section to an adjacent optical waveguide section. This is of particular interest when the light passing through the end surface of that optical waveguide section which has the enlarged core is intended to be imaged on a receiver having an enlarged light-sensitive layer.

The optical waveguide, or each of the individual optical waveguide sections, is preferably a single-mode waveguide. However, the modular concept of the invention means that different waveguide types may also be combined with one another, for example single-mode fibers and multimode fibers. In principle, it is also possible to use only multimode fibers.

It should be mentioned that the use of different wavelengths for transmitting data for a number of data channels is admittedly preferable, but is not absolutely essential. If only one wavelength is used, for example, different data channels can be provided by different coding or by different time windows. In this case, the adjacent end surfaces of two optical waveguide sections form, for example, a 50/50 beam splitter which ensures that light is in each case passed to the transmitting or receiving component. The data for a specific data channel are in this case determined in an evaluation unit.

In accordance with a concomitant feature of the invention, light at a specific wavelength can be selected not directly at the inclined end surfaces, but rather before or after them, for example in a filter associated with the receiving component.

Other features which are considered as characteristic for the invention are set forth in the appended claims.

Although the invention is illustrated and described herein as embodied in electro-optical module for transmitting and/or receiving optical signals on at least two optical data channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will he best understood from the following description of specific embodiments when read in connection with the accompanying drawings.

Other features which are considered as characteristic for the invention are set forth in the appended claims.

Although the invention is illustrated and described herein as embodied in electro-optical module for transmitting and/or receiving optical signals on at least two optical data channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4b shows a side view of the module shown in FIG. 4a;

FIG. 4c shows a plan view of the module shown in FIG. 4a;

FIG. 4d shows a sectional view of the module shown in FIG. 4a;

FIG. 5b shows a side view of the module shown in FIG. 5a;

FIG. 5c shows a front view of the module shown in FIG. 5a;

DESCRIPTION OF THE PREFERRED EMBODIMENTS

Figure 1:
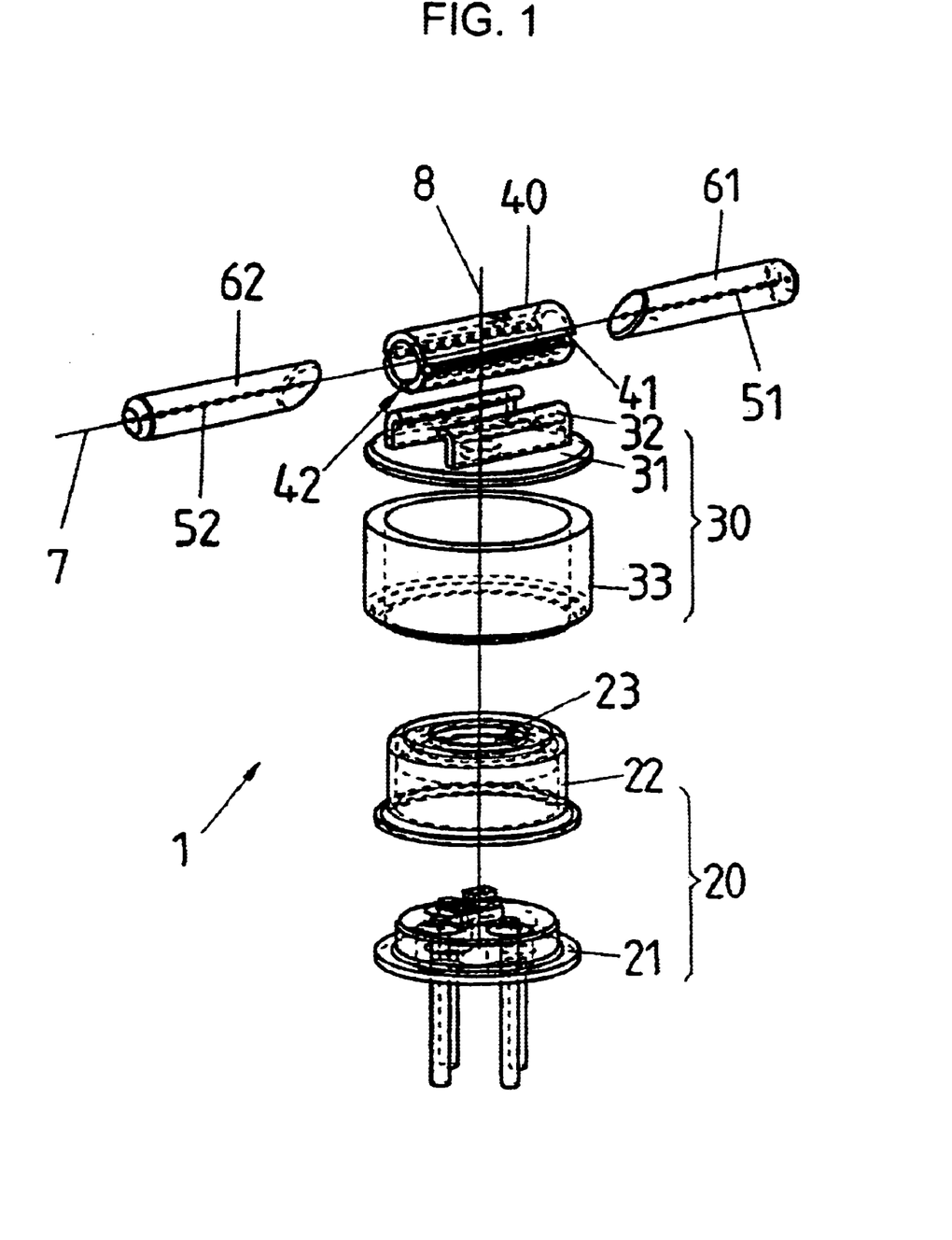
FIG. 1 shows an exploded view of an electro-optical module according to the invention having a transmitting or receiving component arranged in a TO can.
Figures 2A, 2B:
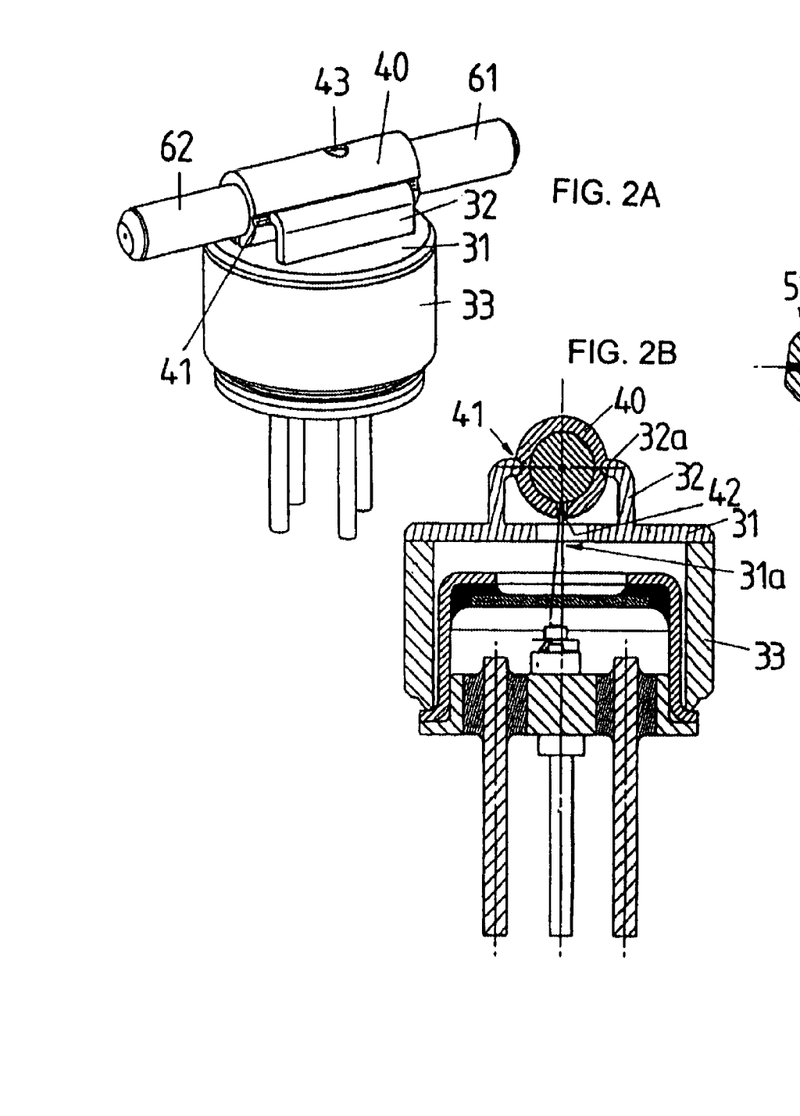
FIG. 2a shows a perspective illustration of the assembled module shown in FIG. 1.
FIG. 2b shows a section through the module as shown in FIG. 2a, transversely with respect to the optical axis of the optical waveguide of the module.
Figure 2C:
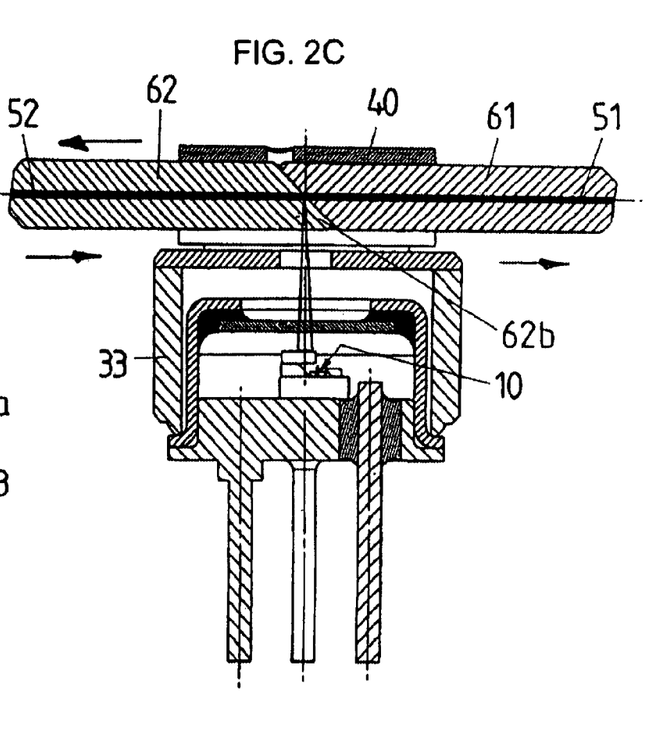
FIG. 2c shows a section through the module shown in FIG. 2a, parallel to the optical axis of the optical waveguide.
Figure 3A:
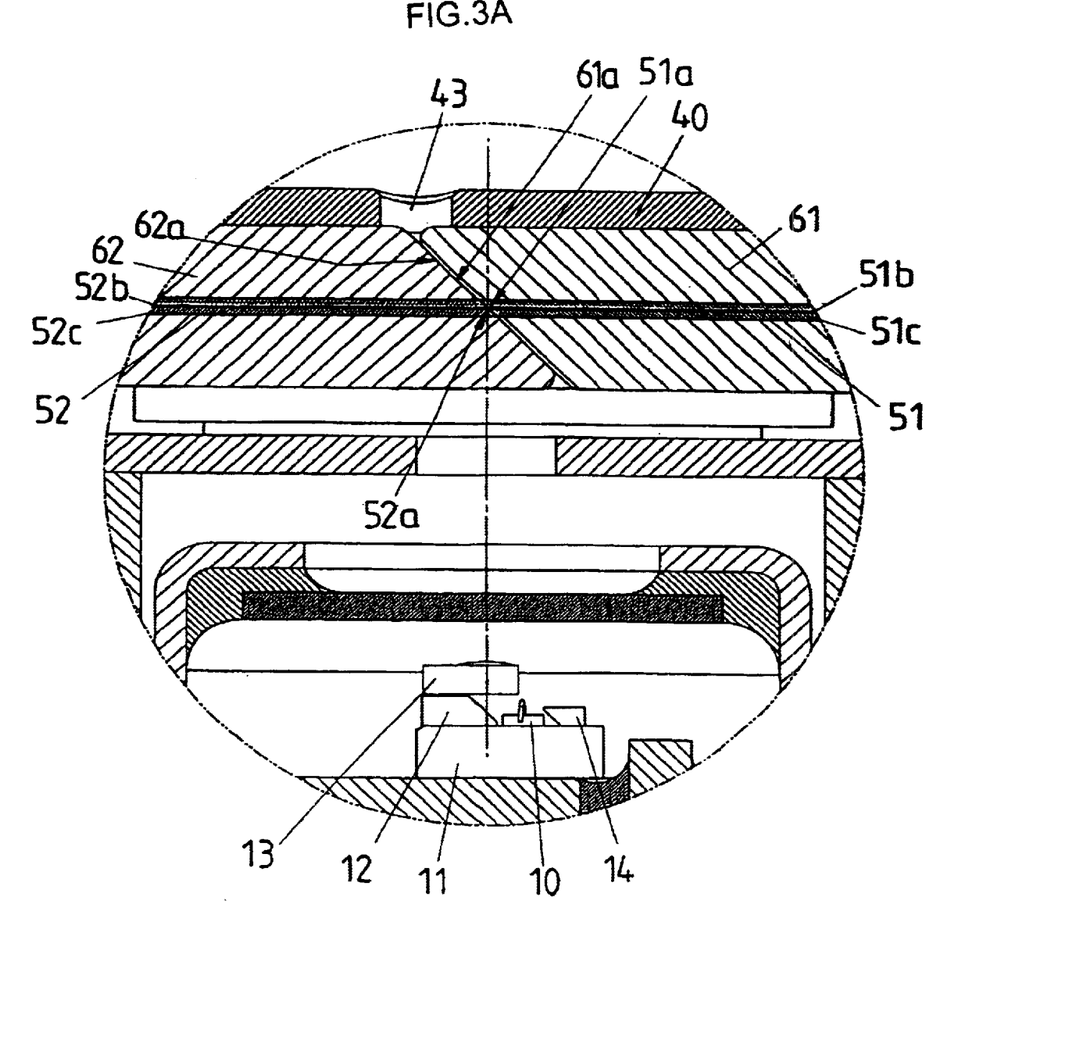
FIG. 3a shows an enlarged view of the coupling area of the module as shown in the illustration in FIG. 2b.
Figure 3B:
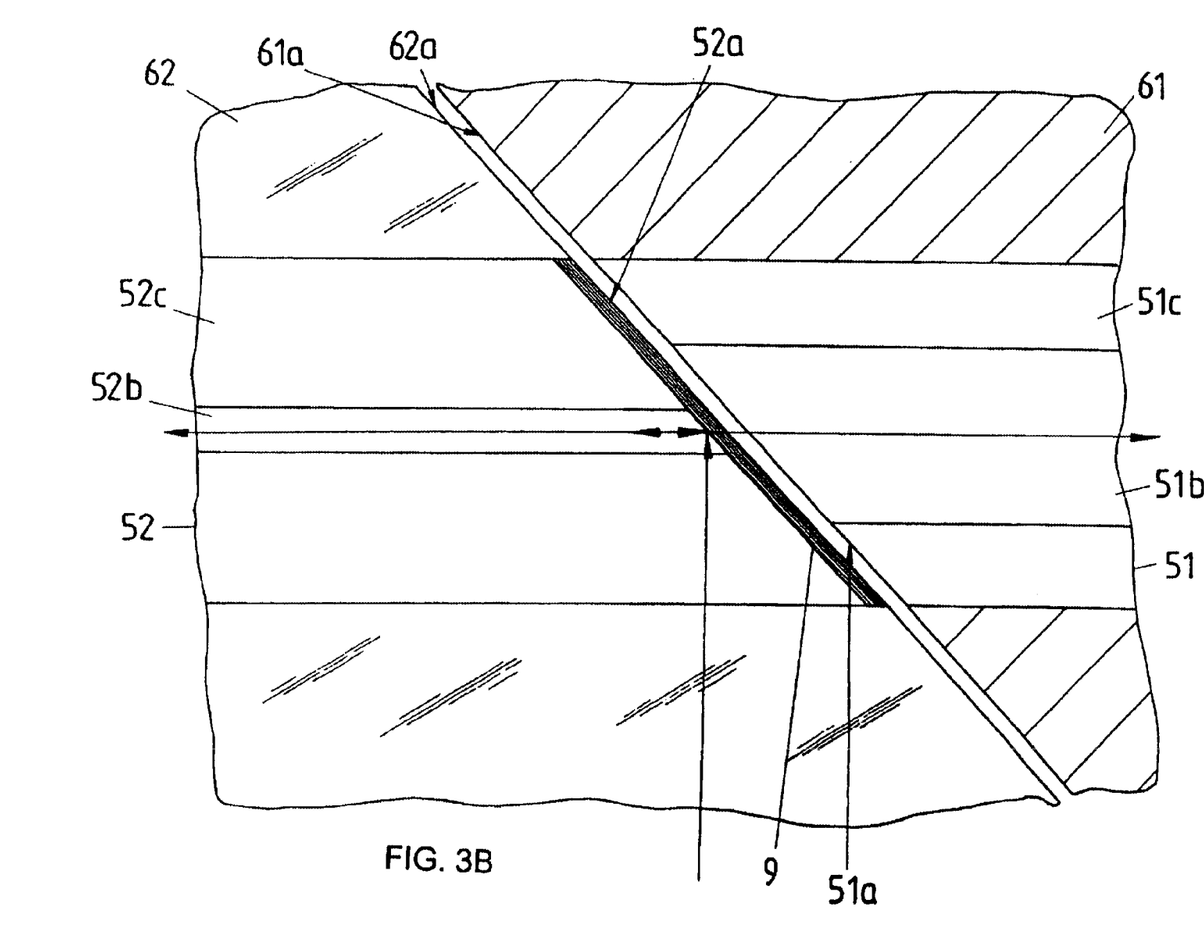
FIG. 3b shows a further enlargement of the coupling area of the module.

Referring now to the figures of the drawing in detail and first, particularly, to FIGS. 1–3 thereof, there is shown a module according to the invention in which coupling for a specific wavelength is provided between a transmitting or receiving component and an optical waveguide.

The module 1 has a transmitting or receiving component 10, in particular a laser diode or a photodiode, which is arranged in a TO can 20. The TO can 20 is held in a connection or mounting pack 30, which has a holding plate 31 with holding elements 32 for attachment of a mounting tube 40. The mounting tube 40 accommodates two optical waveguide sections 51, 52, which are fixed in the respective glass ferrules 61, 62.

In this case, the transmitting or receiving component in the illustrated exemplary embodiment is a laser diode 10 which is arranged on a mount 11, and preferably composed of silicon (see FIG. 3a). Light emitted from the laser diode 10 is deflected via a deflection prism 12 onto a coupling lens 13, from where it is emitted upward.

The TO can 20 has a base plate 21 with four electrical bushings, which are used to make electrical contact with the laser chip 10 and with a monitoring diode 14. Furthermore, the TO can has a can part 22 which has a window 23 on its upper face, so that light from the laser diode 10 can be emitted upward or, if the arrangement is designed with an essentially identical structure as a receiving unit, light for detection can fall on a receiving component. TO cans are known per se in the prior art, so they will not be described any further here.

The connection pack 30 has a cylindrical accommodation part 33 and the already mentioned holding or mounting plate 31. The accommodation part 33 is in this case used to accommodate the TO can 20. The holding plate 31 which, as shown in FIG. 2b, likewise has a window 31a, has two holding elements 32, which are spaced apart from one another, are opposite one another and extend longitudinally, whose upper ends are curved and form guide surfaces 32a. The holding elements 32 are used to hold the mounting tube 40 (also referred to as a split sleeve), which has two diametrically opposite longitudinal grooves 41 corresponding to the holding surfaces 32a. The mounting tube 40 can easily be pushed onto the holding elements, without any play.

The mounting tube 40 has a continuous longitudinal slot 42 which is aligned with respect to the holding plate in such a manner that it points downward at right angles and such that the light emitted from the transmitting diode 10 can pass through it.

Two glass ferrules 61, 62 having respective inclined end surfaces 61a, 61b are arranged without any play in the mounting tube 40 in such a way that the end surfaces abut against one another essentially without any gap at the joint. The mounting tube 40, which is provided with the longitudinal slot 42, in this case exerts a slight spring force on the glass ferrules 61, 62, thus compensating for tolerances in the internal diameter of the mounting tube 40.

The glass ferrules 61, 62 are installed in the mounting tube 40 simply by using the axial pressure to force the glass ferrules 61, 62 together, with any lack of coplanarity that is still present being overcome by rotating the individual ferrules about their common axis 7.

The axis 7 of the mounting tube 40 in this case runs at right angles to the axis 8 of the TO can 20 and of the connection pack 30.

As will be explained in the following text, in particular with reference to FIGS. 3a, 3b, the end surfaces 61a, 62a of the ferrules are inclined at an angle of 45°. Optical waveguides 51, 52 are fixed in the ferrules and likewise have inclined end surfaces, to be precise at the same angle, in order to ensure coplanarity. The optical waveguides 51, 52 in the respective glass ferrules 61, 62 form optical waveguide sections which are joined to one another at the inclined end surfaces.

The optical waveguides 51, 52 are glass fibers which have a core area 51b, 52b and a fiber sheath 51c, 52c. The end surfaces 51a, 52a of the glass fibers 51, 52 are polished such that they are inclined. In this case, the end surface 52a of one optical waveguide section 52 is coated with a wavelength-selective filter 9, which acts as a wavelength-selective mirror and ensures that light emitted from the laser diode 10 and carried to the end surface 52a of the optical waveguide section 52 is injected only into the optical waveguide section 52 while, in the opposite direction, light signals which are carried in the optical waveguide section 52 and are at a different wavelength (and are hence associated with a different data channel) pass through the end surface 52a and then through the end surface 51a with the surfaces being transparent, and are passed on in the optical waveguide section 51. The other end surface 51a is not coated and is translucent for all wavelengths.

It should be mentioned that, in the exemplary embodiment shown in FIG. 3b, the core 51b of the optical waveguide section 51 has a larger diameter than the core 52b of the optical waveguide section 52. This is particularly advantageous when the light which passes through the end surface of the optical waveguide section 51 having the enlarged core 51b is intended to be imaged on a receiver having an enlarged light-sensitive layer.

A circular opening 43 is formed in the mounting sleeve 40 in the area of the mutually adjacent end surfaces 61a, 62a of the glass ferrules 61, 62, through which opening an immersion means whose refractive index is matched can be introduced, filling any gap which may still be present between the two mutually adjacent end surfaces of the ferrules and, in particular, of the optical waveguides 51, 52.

The operation of the module according to the invention will be explained in the following text with reference to FIG. 2c. According to this, light emitted from the laser diode 10 is focused via the coupling lens 13 and is passed through the window 23 in the TO can and 31a in the holding plate 31, as well as through the longitudinal gap 42 in the mounting tube 40, to the lower section 62b, which projects in an inclined manner, of the glass ferrule 62. The glass ferrule is transparent for the light from the laser diode 10, so that the light passes through the glass ferrule 62 and falls on the end surface 52a of the optical waveguide section 52. The light incidence direction is in this case at an angle (here: at right angles) to the axis (7) of the waveguide section 52. The wavelength-selective mirroring on the end surface 52a means that light carried from the transmitting diode (at the extreme left in the illustrated exemplary embodiment) and carried to the end surface is deflected and injected into the optical waveguide section 52. In this case, the light first of all passes through the sheath of the optical waveguide section, from where it falls on the core area, where it is very largely reflected at an incidence angle of 45°. The wavelength-selective filter is in this case designed such that it is naturally reflective for the wavelength emitted from the laser diode 10. For other wavelengths, the interface between the two optical waveguide sections 52, 51 is, on the other hand, very largely transparent, so that light injected into the waveguide section 52 from the left is passed on into the waveguide section 51.

With the same arrangement, the transmitting or receiving component 10 may also be a receiving diode, in which case light at a specific wavelength is deflected by the end surface 52a, which is coated with a wavelength-selective filter, passes through the sheath of the optical waveguide and through the glass ferrule, and is emitted at an angle (here: at right angles) to the axis 7 of the optical waveguide section in the direction of the receiving component 10.

It should be mentioned that light from the transmitting or receiving component 10 can also be injected into or output from the optical waveguide section 52 at an angle other than 45°, for example at an angle of 46°, 47° or even 60°. For this purpose, the TO can is arranged, for example, such that its axis 8 is not at right angles to the optical waveguide axis 7 (as in FIGS. 1, 2), but is tilted slightly with respect to the optical waveguide 51, 52. It is also within the scope of the invention for the two end surfaces of the optical waveguide sections 51, 52 not both to be at an angle of 45°. The only important factor is that the light falls onto the end surface of the respective optical waveguide section at an angle such that the light is deflected on the end surface and is injected into the optical waveguide section with a high insertion coupling level.

The module illustrated in FIGS. 1 to 3 represents a basic component of a kit by means of which very widely ranging options can be provided for producing a transmitting and/or receiving module for optical data transmission. For example, a number of transmitting arrangements as shown in FIG. 1 or receiving arrangements as shown in FIG. 1 can be arranged one behind the other in the direction of the optical axis of an optical waveguide, with light in each case being injected or output via an inclined end surface of an optical waveguide section, so that a number of wavelengths can be injected into and/or output from optical waveguides successively. A very wide range of options for a multiplexer/demultiplexer can be provided, as required.

Figure 8:
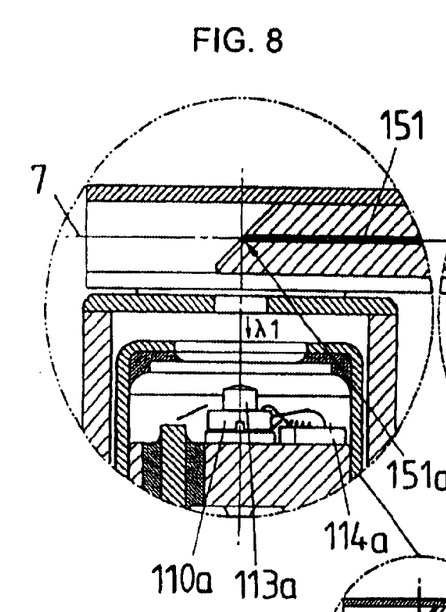
FIG. 8 shows an enlarged view of the left-hand coupling area illustrated in FIG. 4d.
Figures 9, 10:
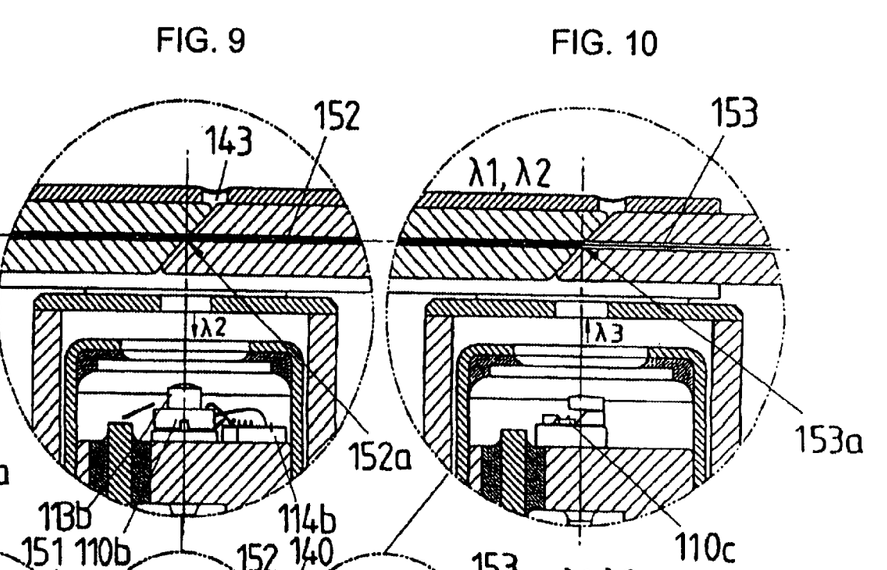
FIG. 9 shows an enlarged view of the middle coupling area illustrated in FIG. 4d.
FIG. 10 shows an enlarged view of the right-hand coupling area illustrated in FIG. 4d.

In this context, FIGS. 4a to 4d illustrate an exemplary embodiment in which a number of waveguide sections are used for injecting one wavelength and for outputting two further wavelengths (referred to as a tri-port bidirectional component). FIGS. 8–10 each show an enlarged view of a respective one of the waveguide sections.

Figure 4A:
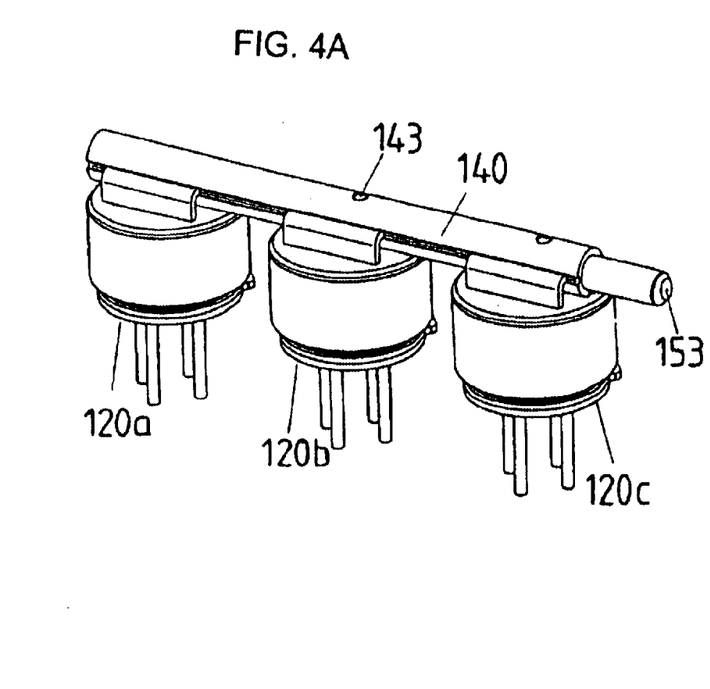
FIG. 4a shows a perspective illustration of a module according to the invention, having three transmitting or receiving components which are arranged one behind the other and are two each arranged in a TO can.
Figure 4B:
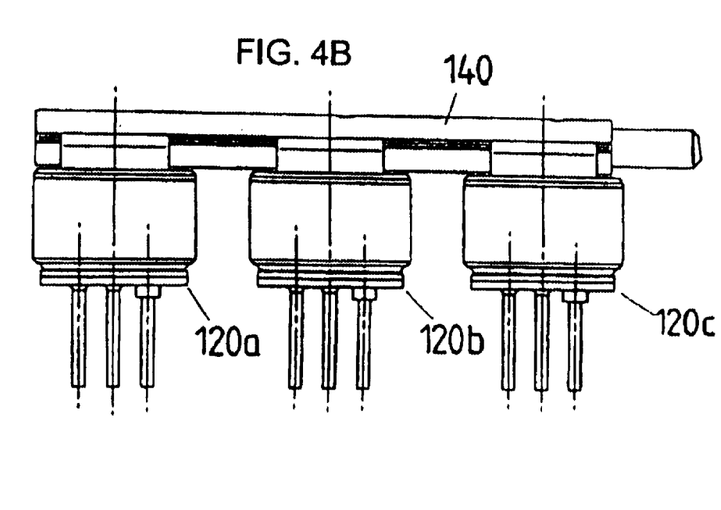
Figure 4C:
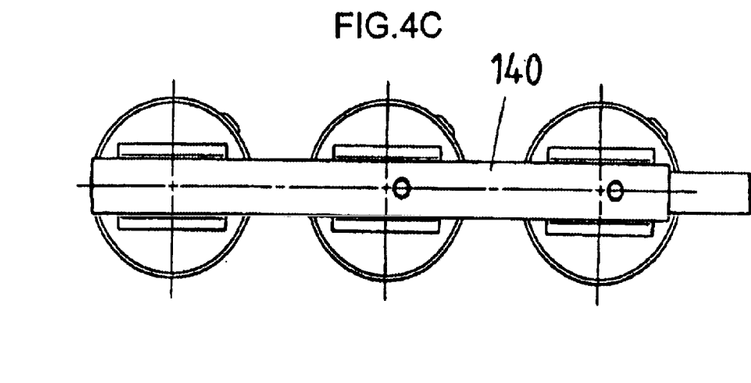
Figure 4D:
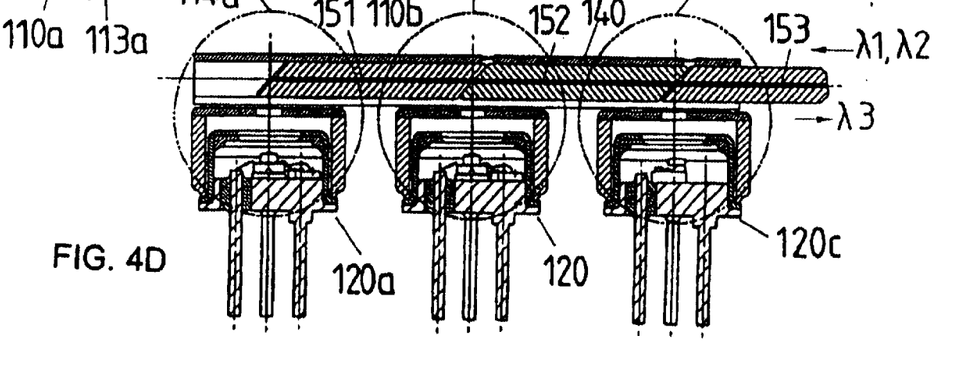

As can be seen in particular from the section illustrated in FIG. 4d, three optical waveguide sections 151, 152, 153, each having end surfaces polished at an angle of 45°, are located in a continuous mounting tube 140. In order to introduce an immersion means, a number of circular openings 143 are incorporated in the mounting tube 140, as shown in FIGS. 1 to 3.

One end surface of each optical waveguide section has an associated transmitting or receiving element arranged in a TO can. In a corresponding way, three TO cans 120a, 120b, 120c are provided, of which the two left TO cans have a receiving component 110a, 110b (See FIGS. 8–9), and the right TO can 120c has a transmitting component 110c (See FIG. 10). The TO can 120c in this case corresponds to the TO can 20 in FIG. 1. In principle, the TO cans 120a, 120b are constructed in the same way as the TO can 20 in FIG. 1, with each receiving component 110a, 110b also having an associated preamplifier 114a, 114b. Once again, a coupling lens 113a, 113b is provided, which focuses onto the optically active area of the receiving component 110a, 110b the light which is deflected by the end surface of the optical waveguide section 151, 152 and is emitted in the direction of the receiving component 110a, 110b.

In the module according to the invention shown in FIGS. 4a–d, the left end surface 153a of the optical waveguide section 153 is provided with a wavelength-selective filter in such a manner that light emitted from the transmitting component 110c and at the wavelength λ3 is injected into the optical waveguide section 153, and is deflected to the right. Light signals at the wavelengths λ1, λ2, which are injected from the right-hand side in a manner not shown in any more detail, in contrast, pass through the end surface 153a without any interference (and, of course, also the adjacent, uncoated end surface of the central waveguide section 152).

The wavelength λ2 is now output at the left end surface 152a by an appropriately designed wavelength-selective filter in the direction of the receiving component 110b, and light at the wavelength λ1 is now output at the left end surface 151a of the optical waveguide section 151 in the direction of the receiving component 110a, so that the two wavelengths λ1, λ2 are demultiplexed.

Further wavelengths can be output or injected by adding further appropriate units. An adaptable module for multiplexing and/or demultiplexing of optical signals is thus provided, by means of which light signals for different data channels can be combined in one optical waveguide, and the individual channels can be detected separately.

Figure 5A:
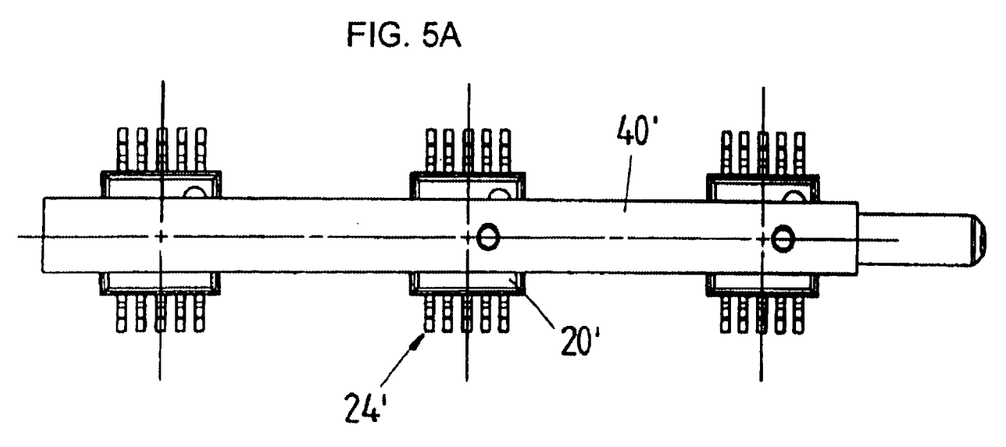
FIG. 5a shows a plan view of a further exemplary embodiment of a module according to the invention, having three transmitting or receiving components arranged one behind the other in a row.
Figure 5B:
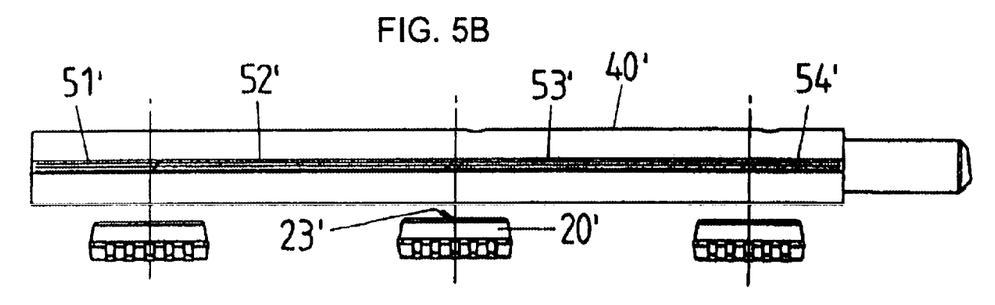
Figure 5C:
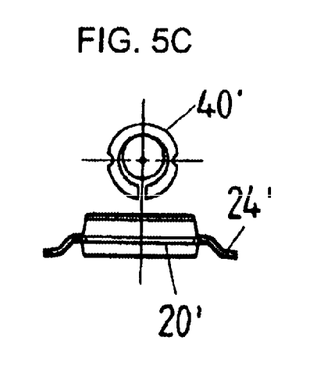

FIG. 5 shows an exemplary embodiment in which the transmitting or receiving component (not illustrated separately) is not arranged in a TO can but in a schematically illustrated semiconductor pack 20'. The semiconductor pack 20' contains a mount (not shown) for the transmitting or receiving component and a connecting contact 24', via which the transmitting or receiving component can be connected to a printed circuit board.

A number of optical waveguide sections 51', 52', 53' 54' are formed, in a manner corresponding to FIG. 1, in a mounting tube 40' which is preferably continuous. The mounting tube 40' is mounted on the semiconductor packs 20' (not illustrated) in a similar way to that shown in FIG. 1. In order to allow light to pass through, the semiconductor packs each have a light outlet opening 23' on their side facing the mounting tube.

The method of operation of the module is the same as that of the already described modules, so that reference should be made to the explanation relating to them.

Figure 6:
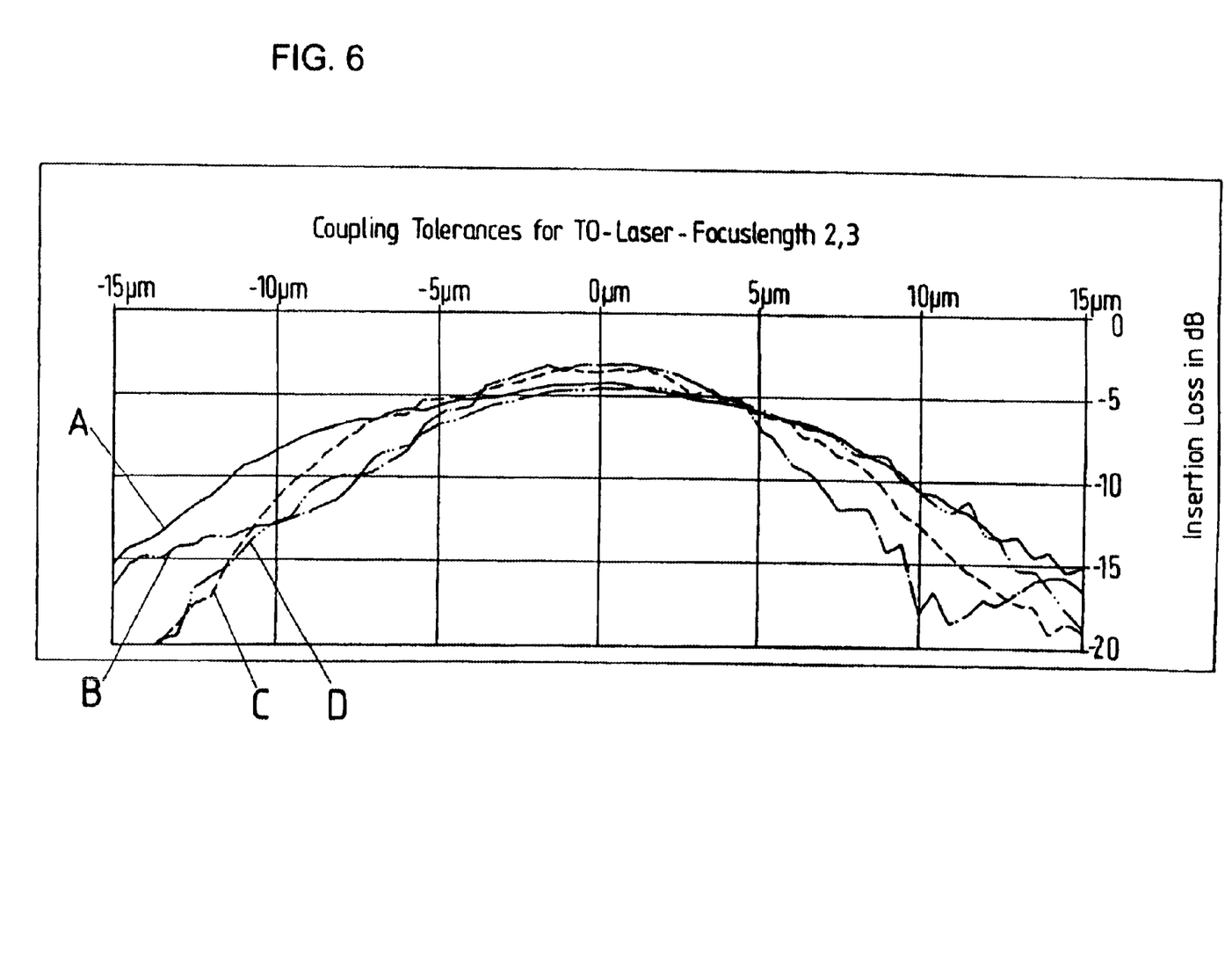
FIG. 6 shows a diagram illustrating the insertion loss as a function of injection tolerances for a number of coupling methods.
Figure 7A:
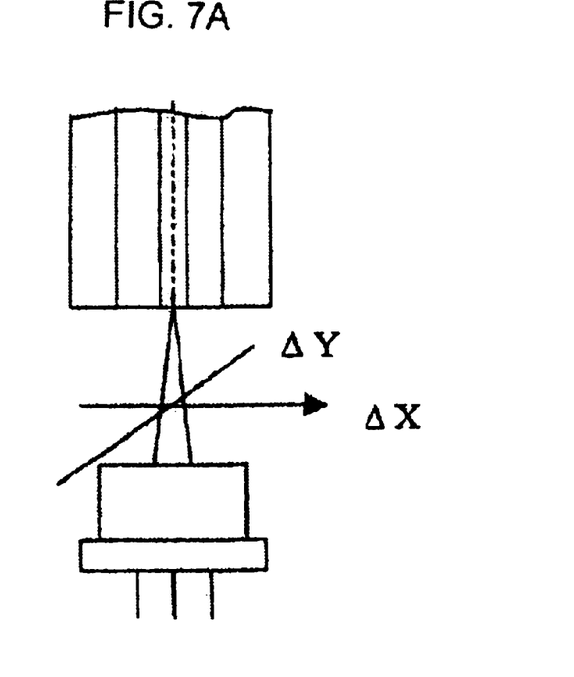
FIG. 7a shows a schematic illustration of an arrangement for producing a measurement curve as shown in FIG. 6, in which light is injected into the end face of an optical waveguide.
Figure 7B:
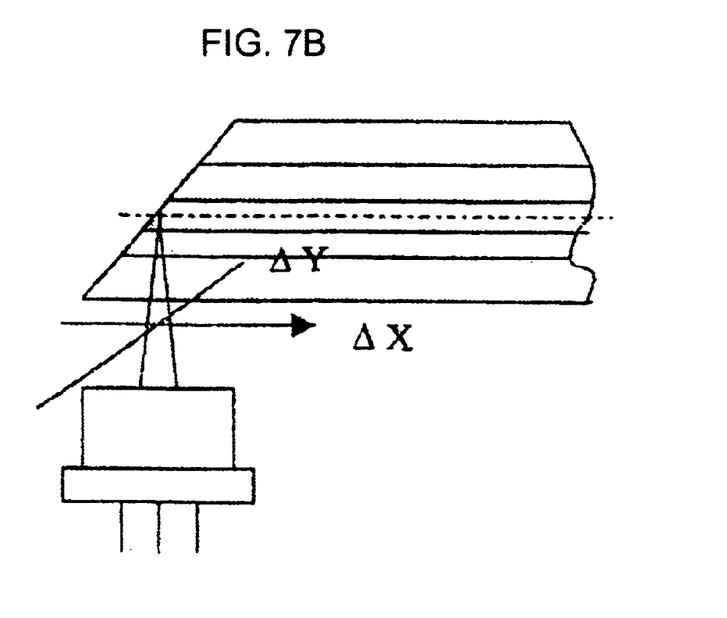
FIG. 7b shows a schematic illustration of an arrangement for producing a measurement curve as shown in FIG. 6, in which light is injected according to the invention into an optical waveguide.

FIG. 6 provides an illustration in the form of a graph for the insertion loss when injecting light into an optical fiber, as a function of the location at which the light is injected, for a number of types of coupling. In this case, the injection was carried out in accordance with the arrangement shown in FIG. 7b for the measurement curves A, D, on the basis of which the light is injected according to the invention via an inclined, mirrored end surface, which deflects the injected light into the optical waveguides. The measurement curves B, C show injection processes in which, as an alternative, light was injected at the end, as shown in FIG. 7a.

For the curve A, in order to simulate coupling tolerances, the focus of the injected radiation has been shifted in the Y-direction out of the core area of the fiber, and for the measurement curve D, it has been shifted in the Y-direction out of the core area of the fiber. The value "0 $\mu$m" in this case indicates the center of the fiber core. In the same way, a shift in the X-direction was used for the measurement curve B, and a shift in the Y-direction was used for the measurement curve C.

The illustrated measurement curves show that, for optimum injection (shift=0 $\mu$m), the insertion loss with 45° injection according to the invention is about −5 dB, and is thus somewhat greater than the insertion loss for injection at the end, which is about −3 dB. However, the curves for 45° injection are flatter, i.e. the tolerance with respect to coupling tolerances is greater. The waveguide core for the measurement used had a diameter of 9 $\mu$m.

We claim:

1. An electro-optical module for transmitting and/or receiving light of a plurality of optical data channels, comprising:

an optical waveguide for carrying light of a plurality of optical data channels, said optical waveguide having an optical axis;

at least one optical component, said optical component selected from the group consisting of a transmitting component providing light that is injected into said optical waveguide, and a detecting component that receives and detects light output from said optical waveguide;

a first glass ferrule;

a second glass ferrule; and a wavelength-selective filter;

said optical waveguide forming at least two optical waveguide sections;

said at least two optical waveguide sections including a first optical waveguide section having an inclined end surface and a second optical waveguide section having an inclined end surface;

said inclined end surface of said first optical waveguide section being positioned along the optical axis and adjacent said inclined end surface of said second optical waveguide section;

said inclined end surface of said second optical waveguide section configured to perform a function selected from the group consisting of:
  injecting light for one of said plurality of said optical data channels into said optical waveguide when the injected light is provided to said inclined end surface of said second optical waveguide section at an angle relative to the optical axis of said waveguide, and
  outputting light of one of said plurality of said optical data channels from said optical waveguide at an angle relative to the optical axis of said waveguide;

said first glass ferrule receiving said first optical waveguide section and having an end surface that is inclined to correspond to said inclined end surface of said first optical waveguide section, said first glass ferrule being transparent for the light of the plurality of the optical channels;

said second glass ferrule receiving said second optical waveguide section and having an end surface that is inclined to correspond to said inclined end surface of said second optical waveguide section, said second glass ferrule being transparent for the light of the plurality of the optical channels;

said wavelength-selective filter coating at least one end surface that is selected from the group consisting of said inclined end surface of said first optical waveguide section and said inclined end surface of said second optical waveguide section; and light coupled between said optical component and at least one glass ferrule selected from a group consisting of said first glass ferrule and said second glass ferrule without being guided by an optical waveguide.

2. The module according to claim 1, wherein said inclined end surface of said first optical waveguide section and said inclined end surface of said second optical waveguide section are coplanar.

3. The module according to claim 1, wherein said inclined end surface of said first optical waveguide section and said inclined end surface of said second optical waveguide section are coplanar.

4. The module according to said claim 3, wherein said inclined end surface of said first optical waveguide section and said inclined end surface of said second optical waveguide section each form an angle of essentially 45° with respect to the optical axis of said optical waveguide.

5. An electro-optical module for transmitting and/or receiving light of a plurality of optical data channels, comprising:

a wavelength-selective filter;

an optical waveguide for carrying light of a plurality of optical data channels, said optical waveguide having an optical axis, said optical waveguide forming at least two optical waveguide sections, said at least two optical waveguide sections including a first optical waveguide section having an inclined end surface and a second optical waveguide section having an inclined end surface;

at least one optical component, said optical component selected from the group consisting of a transmitting component providing light that is injected into said optical waveguide, and a detecting component that receives and detects light output from said optical waveguide;

a first glass ferrule;

a second glass ferrule; and a mounting tube receiving said first glass ferrule, said first optical waveguide section, said second glass ferrule, and said second optical waveguide section;

said mounting tube axially positioning said first glass ferrule with respect to said second glass ferrule;

said inclined end surface of said first optical waveguide section being positioned along the optical axis and adjacent said inclined end surface of said second optical waveguide section;

said inclined end surface of said second optical waveguide section configured to perform a function selected from the group consisting of:
  injecting light for one of said plurality of said optical data channels into said optical waveguide when the injected light is provided to said inclined end surface of said second optical waveguide section at an angle relative to the optical axis of said waveguide, and
  outputting light of one of said plurality of said optical data channels from said optical waveguide at an angle relative to the optical axis of said waveguide;

said first glass ferrule receiving said first optical waveguide section and having an end surface that is inclined to correspond to said inclined end surface of said first optical waveguide section, said first glass ferrule being transparent for the light of the plurality of the optical channels;

said second glass ferrule receiving said second optical waveguide section and having an end surface that is inclined to correspond to said inclined end surface of said second optical waveguide section, said second glass ferrule being transparent for the light of the plurality of the optical channels;

said wavelength-selective filter coating at least one end surface that is selected from the group consisting of said inclined end surface of said first optical waveguide section and said inclined end surface of said second optical waveguide section; and light coupled between said optical component and at least one glass ferrule selected from a group consisting of said first glass ferrule and said second glass ferrule without being guided by an optical waveguide.

6. The module according to claim 5, wherein said mounting tube is formed with a radial opening for insertion of an immersion means, said radial opening formed adjacent said first optical waveguide section and said second optical waveguide section.

7. The module according to claim 5, comprising:
  a semiconductor pack for mounting on a printed circuit board, said optical component located in said semiconductor pack;
  said mounting tube having a side mounted to said semiconductor pack.

8. The module according to claim 5, wherein said mounting tube is formed with a longitudinal slot, said mounting tube surrounds said first glass ferrule and said second glass ferrule and exerts a spring force on said first glass ferrule and said second glass ferrule.

9. The module according to claim 8, comprising:
a holder;
said mounting tube 40 formed with a fixing structure for fixing said mounting tube on said holder.

10. The module according to claim 9, wherein said fixing structure is longitudinal grooves.

11. The module according to claim 5, comprising:
a holder;
said mounting tube formed with a fixing structure for fixing said mounting tube on said holder.

12. The module according to claim 11, wherein said fixing structure is longitudinal grooves.

13. The module according to claim 5, comprising:
immersion means;
said first optical waveguide section and said second optical waveguide section defining a gap therebetween;
said immersion means filling said gap and having a matched refractive index.

14. The module according to claim 13, wherein said mounting tube 40 is formed with a radial opening for insertion of an immersion means, said radial opening formed adjacent said first optical waveguide section and said second optical waveguide section.

15. The module according to claim 5, comprising:
a plurality of waveguide sections having inclined surfaces, said plurality of said waveguide sections including said at least two waveguide sections;
said at least one optical component including a plurality of optical components that are each selected from the group consisting of a transmitting component providing light that is injected into said optical waveguide, and a detecting component that receives and detects light output from said optical waveguide;
said plurality of said optical components being sequentially located;
each one of said plurality of said optical components being associated with an inclined surface selected from the group consisting of said inclined surfaces of said plurality of said waveguide sections.

16. The module according to claim 15, wherein said plurality of said optical components are located along the optical axis.

17. The module according to claim 5, wherein said second optical waveguide section has an optical axis and said optical component has an optical axis that runs essentially perpendicular to the optical axis of said second optical waveguide section.

18. An electro-optical module for transmitting and/or receiving light of a plurality of optical data channels, comprising:
an optical waveguide for carrying light of a plurality of optical data channels, said optical waveguide having an optical axis;
at least one optical component, said optical component selected from the group consisting of a transmitting component providing light that is injected into said optical waveguide, and a detecting component that receives and detects light output from said optical waveguide; and
a TO-can holding said optical component;
said optical waveguide forming at least two optical waveguide sections;

said at least two optical waveguide sections including a first optical waveguide section having an inclined end surface and a second optical waveguide section having an inclined end surface;
said inclined end surface of said first optical waveguide section being positioned along the optical axis and adjacent said inclined end surface of said second optical waveguide section;
said inclined end surface of said second optical waveguide section configured to perform a function selected from the group consisting of:
injecting light for one of said plurality of said optical data channels into said optical waveguide when the injected light is provided to said inclined end surface of said second optical waveguide section at an angle relative to the optical axis of said waveguide, and
outputting light of one of said plurality of said optical data channels from said optical waveguide at an angle relative to the optical axis of said waveguide.

19. The module according to claim 18, comprising:
a first glass ferrule receiving said first optical waveguide section and having an end surface that is inclined to correspond to said inclined end surface of said first optical waveguide section, said first glass ferrule being transparent for the light of the plurality of the optical channels;
a second glass ferrule receiving said second optical waveguide section and having an end surface that is inclined to correspond to said inclined end surface of said second optical waveguide section, said second glass ferrule being transparent for the light of the plurality of the optical channels;
a mounting tube that receives said first glass ferrule, said first optical waveguide section, said second glass ferrule, and said second optical waveguide section and that and axially positions said first glass ferrule with respect to said second glass ferrule; and
a mounting pack that accommodates said TO can, said mounting pack including a retaining cap for accommodating and holding said mounting tube.

20. The module according to claim 19, wherein said mounting pack is formed with a window through which light can pass.

21. The module according to claim 19, wherein said mounting pack is formed of a translucent material.

22. The module according to claim 5, comprising:
a coupling lens;
said optical component and said inclined end surface of said second optical waveguide section defining a beam path therebetween;
said coupling lens located in the beam path between said optical component and said inclined end surface of said second optical waveguide section.

23. An electro-optical module for transmitting and/or receiving light of a plurality of optical data channels, comprising:
an optical waveguide for carrying light of a plurality of optical data channels, said optical waveguide having an optical axis; and
at least one optical component, said optical component selected from the group consisting of a transmitting component providing light that is injected into said optical waveguide, and a detecting component that receives and detects light output from said optical waveguide;

said optical waveguide forming at least two optical waveguide sections;

said at least two optical waveguide sections including a first optical waveguide section having an inclined end surface and a second optical waveguide section having an inclined end surface;

said inclined end surface of said first optical waveguide section being positioned along the optical axis and adjacent said inclined end surface of said second optical waveguide section;

said inclined end surface of said second optical waveguide section configured to perform a function selected from the group consisting of:

injecting light for one of said plurality of said optical data channels into said optical waveguide when the injected light is provided to said inclined end surface of said second optical waveguide section at an angle relative to the optical axis of said waveguide, and outputting light of one of said plurality of said optical data channels from said optical waveguide at an angle relative to the optical axis of said waveguide;

said second optical waveguide section having a core;

said first optical waveguide section being adjacent said second optical waveguide section and having a core that is larger than said core of said second waveguide section.

24. The module according to claim 1, wherein said optical waveguide is a single-mode waveguide.

25. The module according to claim 1, comprising:

a plurality of wavelength selective filter coatings that are selective for different wavelengths;

said at least two waveguide sections defining a plurality of waveguide sections having a plurality of inclined end surfaces; and each one of said plurality of said different wavelength selective coatings being associated with a respective one of the plurality of the optical data channels and being coated on a respective one of said plurality of said inclined end surfaces.

26. An optical waveguide structure for transmitting and/or receiving light of a plurality of optical data channels, comprising:

an optical waveguide for carrying light of a plurality of optical data channels, said optical waveguide having an optical axis;

a wavelength-selective filter;

a first glass ferrule; and a second glass ferrule;

said optical waveguide forming at least two optical waveguide sections;

said at least two optical waveguide sections including a first optical waveguide section having an inclined end surface and a second optical waveguide section having an inclined end surface;

said inclined end surface of said first optical waveguide section being positioned along the optical axis and adjacent said inclined end surface of said second optical waveguide section;

said inclined end surface of said second optical waveguide section configured to perform a function selected from the group consisting of:

injecting light for one of said plurality of said optical data channels into said optical waveguide when the injected light is provided to said inclined end surface of said second optical waveguide section at an angle relative to the optical axis of said waveguide, and outputting light of one of said plurality of said optical data channels from said optical waveguide at an angle relative to the optical axis of said waveguide;

said first glass ferrule receiving said first optical waveguide section and having an end surface that is inclined to correspond to said inclined end surface of said first optical waveguide section, said first glass ferrule being transparent for the light of the plurality of the optical channels;

said second glass ferrule receiving said second optical waveguide section and having an end surface that is inclined to correspond to said inclined end surface of said second optical waveguide section, said second glass ferrule being transparent for the light of the plurality of the optical channels; and said wavelength-selective filter coating at least one end surface that is selected from the group consisting of said inclined end surface of said first optical waveguide section and said inclined end surface of said second optical waveguide section.

27. An optical waveguide structure for transmitting and/or receiving light of a plurality of optical data channels, comprising:

an optical waveguide for carrying light of a plurality of optical data channels, said optical waveguide having an optical axis;

said optical waveguide forming at least two optical waveguide sections;

said at least two optical waveguide sections including a first optical waveguide section having an inclined end surface and a second optical waveguide section having an inclined end surface;

said inclined end surface of said first optical waveguide section being positioned along the optical axis and adjacent said inclined end surface of said second optical waveguide section;

said inclined end surface of said second optical waveguide section configured to perform a function selected from the group consisting of:

injecting light for one of said plurality of said optical data channels into said optical waveguide when the injected light is provided to said inclined end surface of said second optical waveguide section at an angle relative to the optical axis of said waveguide, and outputting light of one of said plurality of said optical data channels from said optical waveguide at an angle relative to the optical axis of said waveguide;

said second optical waveguide section having a core;

said first optical waveguide section being adjacent said second optical waveguide section and having a core that is larger than said core of said second waveguide section.

28. The module according to claim 1, wherein said inclined surface of said first waveguide section and said inclined end surface of said second waveguide section are adjacent and form a beam splitter.

29. The module according to claim 28, wherein said beam splitter is a 50/50 beam splitter.

30. An optical waveguide structure for transmitting and/or receiving light of a plurality of optical data channels, comprising:

a wavelength-selective filter;

an optical waveguide for carrying light of a plurality of optical data channels, said optical waveguide having an optical axis, said optical waveguide forming at least two optical waveguide sections, said at least two optical waveguide sections including a first optical waveguide section having an inclined end surface and a second optical waveguide section having an inclined end surface;

a first glass ferrule;

a second glass ferrule; and a mounting tube receiving said first glass ferrule, said first optical waveguide section, said second glass ferrule, and said second optical waveguide section;

said mounting tube axially positioning said first glass ferrule with respect to said second glass ferrule;

said inclined end surface of said first optical waveguide section being positioned along the optical axis and adjacent said inclined end surface of said second optical waveguide section;

said inclined end surface of said second optical waveguide section configured to perform a function selected from the group consisting of:

injecting light for one of said plurality of said optical data channels into said optical waveguide when the injected light is provided to said inclined end surface of said second optical waveguide section at an angle relative to the optical axis of said waveguide, and outputting light of one of said plurality of said optical data channels from said optical waveguide at an angle relative to the optical axis of said waveguide;

said first glass ferrule receiving said first optical waveguide section and having an end surface that is inclined to correspond to said inclined end surface of said first optical waveguide section, said first glass ferrule being transparent for the light of the plurality of the optical channels;

said second glass ferrule receiving said second optical waveguide section and having an end surface that is inclined to correspond to said inclined end surface of said second optical waveguide section, said second glass ferrule being transparent for the light of the plurality of the optical channels; and said wavelength-selective filter coating at least one end surface that is selected from the group consisting of said inclined end surface of said first optical waveguide section and said inclined end surface of said second optical waveguide section.

* * * * *